Sept. 6, 1960  E. C. ELSNER  2,951,274
FASTENER OF DOG CONSTRUCTION
Filed Sept. 23, 1957  2 Sheets-Sheet 1
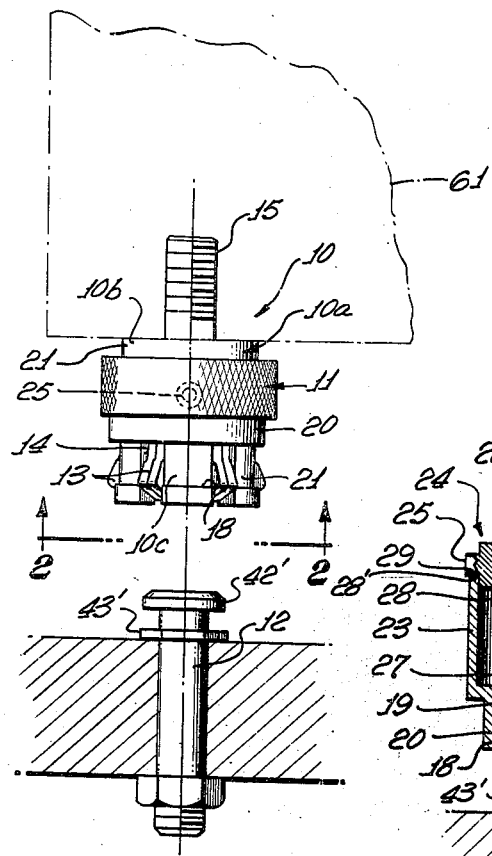
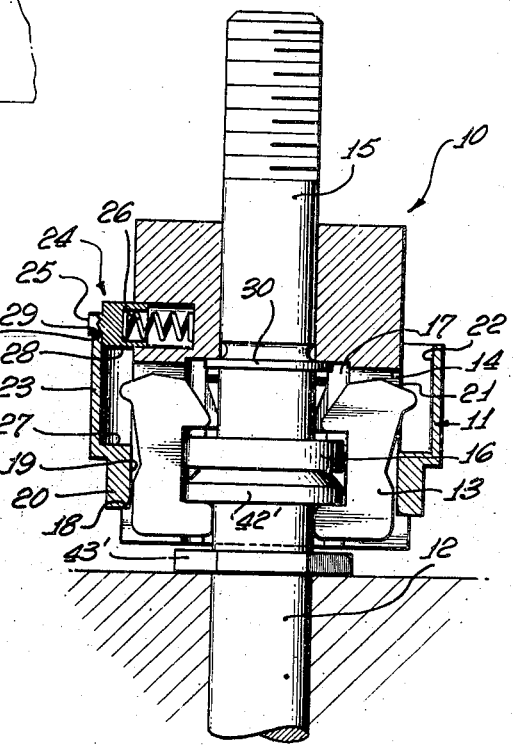
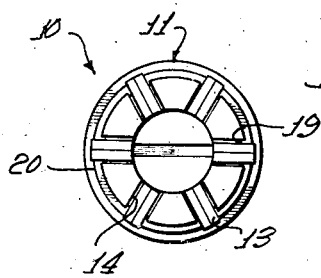
INVENTOR.
EDWIN C. ELSNER
BY
Huebner, Beehler & Worrel
ATTORNEYS.

Sept. 6, 1960 E. C. ELSNER 2,951,274
FASTENER OF DOG CONSTRUCTION
Filed Sept. 23, 1957 2 Sheets-Sheet 2
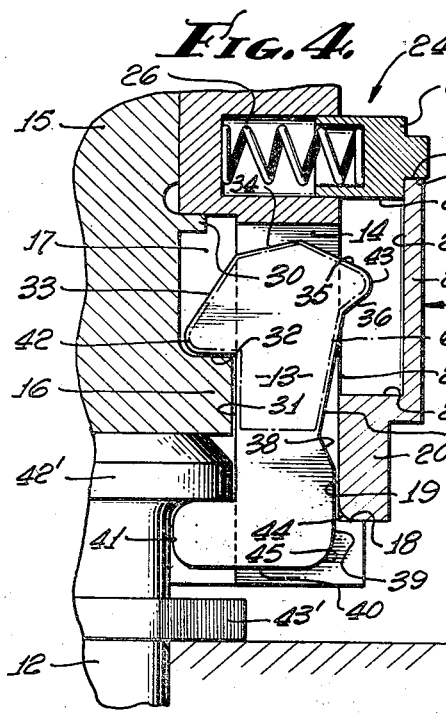
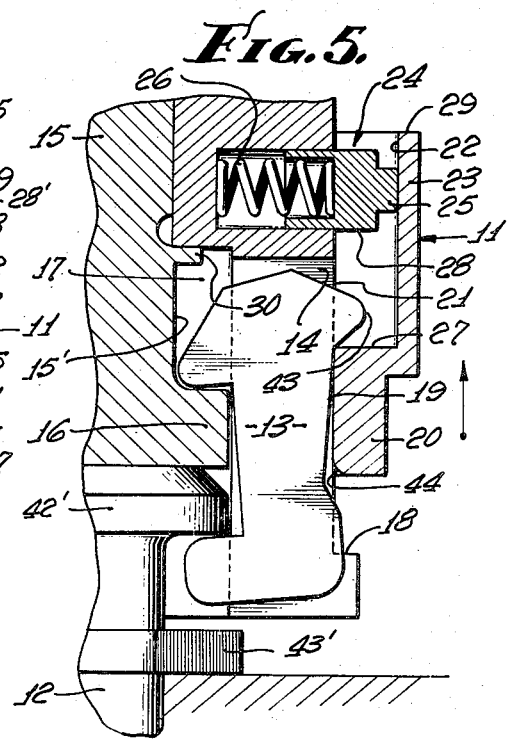
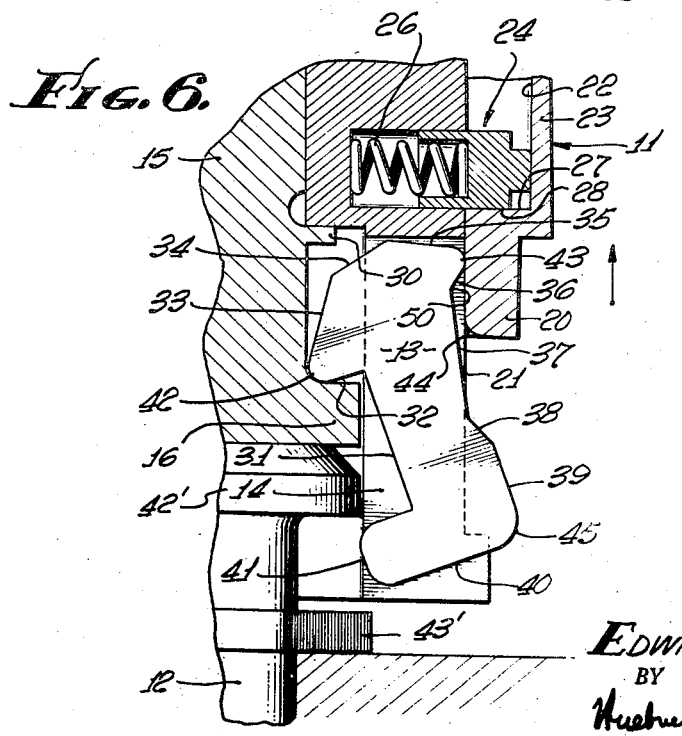
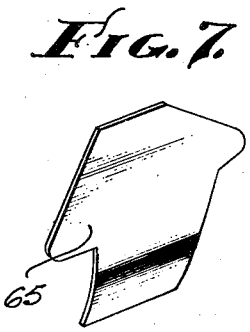
INVENTOR.
EDWIN C. ELSNER
BY
Huebner, Beehler + Worrel
ATTORNEYS.

United States Patent Office 2,951,274
Patented Sept. 6, 1960

2,951,274

FASTENER OF DOG CONSTRUCTION

Edwin C. Elsner, Glendale, Calif., assignor to Aeroquip Corporation, Jackson, Mich., a corporation of Michigan Filed Sept. 23, 1957, Ser. No. 685,515

4 Claims. (Cl. 24—211)

This invention relates to a separable fastener of dog construction in which the dog elements of the device are readily moved into and out of firm fastening engagement with a stud or similar member.

Dog construction fasteners are generally designed with two or more dogs mounted on pivot pins on opposite sides of the fastener member and adapted to separately engage another member, frequently in the nature of a grooved or ridged stud. One end of each dog is moved into contact with the stud member and locked in that position. In cargo shipping use the pivot pins on which the dogs are mounted and on which they rotate, as well as the edges of the dogs which are held in locked engagement with the stud member, are frequently subject to substantial pulling force, and consequently must be constructed of costly materials of considerable strength and thickness and carefully mounted within close tolerances.

An object of the present invention is to provide an improved fastener of dog construction which has substantial strength, but which has relatively thin dog members which are easily and cheaply constructed and which are not required to be rotatably mounted on a pivot pin.

Another object of the invention is to provide a fastener of the type described which has strength equal to or in excess of the strength of other fasteners of dog construction, but which is characterized by low cost of manufacture.

A further object of the invention is to provide a fastener of dog construction of substantial strength which may be quickly and easily fastened and locked in operating position and quickly and easily released therefrom.

Other objects of the invention are to provide a fastener of dog construction which is economical of manufacture, easily assembled, relatively simple in operation, and of general superiority and serviceability.

The present invention is an improvement on the fastener disclosed in United States Letters Patent to me on "Pivoted Dog Construction," No. 2,739,361, granted March 27, 1956. In the present invention a maximum number of dogs may be distributed in a given circumference, the pivot pins are completely eliminated, the height and weight of the overall construction is sharply reduced, the strength of the device is substantially increased, and a more positive open and shut operation is permitted without the use of springs to accomplish it.

The foregoing, as well as other objects and advantages of the invention, will become apparent from a consideration of the description which follows taken in conjunction with the drawings.

In the drawings:

Figure 1 is a side elevation of the fastener in open position suspended above the stud to which it is designed to be fastened.

Figure 2 is a bottom view of the fastener in open position taken on the line 2—2 of Figure 1.

Figure 3 is an enlarged central vertical section through the fastener in locked position on the stud.

Figure 4 is an enlarged vertical fragmentary section of the dog construction assembly showing one dog in locked position on the stud.

Figure 5 is a view similar to Figure 4 showing the locking means partially open.

Figure 6 is a view similar to Figures 4 and 5 showing the dog in unlocked position but with the stud still in contact with the fastener.

Figure 7 is a perspective view of a leaf spring which may be mounted between the dogs in an alternative form of the invention.

In the drawings, the fastener 10 is shown mounted by a threaded stud 15 to a body 61. It will be understood that the mounting may be accomplished by any other suitable means. The fastener 10 includes a slidably mounted locking sleeve or ring 11, generally knurled on the external surface thereof for ease in handling. A stud 12 is separably connected to the fastener 10 by the dog constructions 13.

The body 10a of the fastener 10 is preferably cylindrical and is hollow at its lower end. At its lower end it has a plurality of radially disposed vertical slots 14 cut through the entire thickness of the body of the fastener and open at the lower face of the body 10a. The dog constructions 13 are mounted in the slots 14. The size of each of the slots 14 is sufficient to slidably accommodate a single dog and allow it to rock therein as hereinafter described or, in the preferred embodiment of the invention, two dogs acting in concert with each other and arranged in side-by-side relationship with each other. In an alternative form of the device the two dogs may be separated from each other by a leaf spring 65 shown in Figure 7 which acts as a spacer between them, but in practice it has been found that the leaf spring is optional and not an essential element of the device. If a leaf spring is used it will be understood that the size of each of the slots 14 is sufficient to slidably accommodate the two dogs and the leaf spring 65 mounted between them as a spacer and allow them to rock therein, as hereinafter described.

The upper portion 10b of the body 10a of the fastener 10 is solid and the stud 15 is mounted on it by suitable means. The stud 15 has a flange or head 16 projecting into the hollow tubular section of the body of the fastener and adapted to act as a seat for the dogs 13 when the fastener is in locked position on the stud 15 and also forming a wall of a chamber 17.

The lower portion 10c of the body 10a of the fastener 10 is equipped with an annular shoulder flange 18 at the open end thereof which acts as a seat for the locking sleeve or ring 11 when the fastener is in locked position on the stud 12.

The inside wall 19 of the lower portion 20 of the locking sleeve or ring 11 is of only slightly greater diameter than the outside wall 21 of the body 10a of the fastener 10 on which it is slidably mounted, but the inside wall 22 of the upper portion 23 of the locking sleeve or ring 11 is of substantially greater diameter than the outside wall 21 of the body of the fastener and sufficient to clear a detent mechanism 24 when a spring operated plunger 25 thereof is depressed.

When the locking sleeve or ring 11 is raised to the unlocked position as shown in Figure 6, the plunger 25 is held in depressed position against a compression spring 26 by the inside wall 22 of the locking sleeve or ring 11, and an internally flanged shoulder 27 of the locking sleeve or ring 11 is seated on a sleeve portion 28 of the detent mechanism and thus restricted in its further upward movement.

When the locking sleeve or ring 11 is lowered into full locking position as shown in Figure 4, and is seated on the shoulder flange 18, the plunger 25 of the detent mechanism 24 is in extended position, with the upper rim 29 of the locking sleeve or ring 11 seated on the external surface 28' of the plunger 25, so that the locking sleeve or ring is itself firmly locked against upward movement by the external surface 28' of the plunger 25 and downward movement by the flange 18.

The stud 15 has a flange 30 formed thereon which serves to seat the stud 15 against the upper portion 10b of the body 10a of the fastener 10 and together with the head 16, the upper portion 10b of the body 10a of the fastener 10 and the inside surface 22 of the upper portion 23 of the locking sleeve or ring 11 serves to define the chamber 17 within the confines of which the upper portions of the dogs 13 move.

The dogs 13 are generally of the particular outline shown in the drawing, having surfaces 31, 32, 33, 34, 35, 36, 37, 38, 39 and 40 and hook 41, fulcrum 42 and cam 43. For purposes of reference and description of the configuration of each of the dogs 13, an axis is assumed to be established running vertically of each dog when the fastener is in the locked position shown in Figure 4. A hook 41 extends outwardly from the axis at a right angle thereto. The surface 31 is parallel to the axis and at right angle to the hook 41. The surface 31 in turn is at right angle to the lower surface 32 of a fulcrum 42, which is parallel to the hook 41. The upper surface 33 of the fulcrum 42 extends upwardly and inwardly toward the axis. The fulcrum 42 is rounded to permit the dog to swing or rock thereon.

The surface 34 also extends upwardly and inwardly from the surface 33 to the surface 35, but at a sharply reduced angle. The surface 34 meets the surface 35 slightly beyond the point where the surface 34 bisects the axis of the dog. The surface 35 extends outwardly and downwardly to a rounded point which is on a horizontal plane intersecting the surface 33 about two-thirds of the distance from the center of the rounded angle of the fulcrum 42 to the intersection of the surface 33 and the surface 34. The surface 36 extends a relatively short distance inwardly and downwardly, to a point 50 on a vertical plane just short of midway of the surface 35, and the angle between the surface 35 and the surface 36 forms the cam 43 which is rounded to permit the locking ring 11 to slide over the outside extremity of the cam 43 when the fastener is being placed in locked position.

The surface 37 extends downwardly and inwardly at a sharply reduced angle from the point 50 of its intersection with surface 38 at a point substantially above the horizontal plane of the hook 41.

The surface 38 extends a relatively short distance outwardly and downwardly from the point of intersection with the surface 37 to a point of intersection with surface 39, which point is also substantially above the horizontal plane of the hook 41. The surface 39 extends downwardly and parallel with the surface 31 from the point of intersection with the surface 38 to a point of intersection with the surface 40. The surface 40 extends at a right angle from the point of intersection with surface 39 and forms the foot of the hook 41. The point of intersection between the surfaces 39 and 40 is rounded at 45.

When in locked position, as shown in Fig. 4, the hook 41 of each dog 13 is securely engaged against the under side of the head 42' of the stud 12 and is in position between the head 42' and the flange 43' of the stud 12, while the surface 31 is in loose contact with the outside rim 42" of the head 42' of the stud 12 as well as the outside rim 16' of the head 16 of the stud 15, the fulcrum 42 is engaged against the upper side of the head 16 of the stud 15, and the surface 39 is engaged by the lower inside wall 19 of the locking sleeve or ring 11, all parts being then held in locked position.

When the locking sleeve or ring 11 is moved upwardly out of the locking position as shown in Figure 5, the inside wall 19 of the locking sleeve or ring 11 slidably engages the surface 37 after clearing the surface 38, thereby causing each dog to swing or rock on the fulcrum 42 while the hook 41 commences withdrawing from contact with the head 42' of stud 12. When the upward movement of the locking sleeve or ring 11 is continued to the extent shown in Figure 5, the inside wall 19 of the locking sleeve or ring 11 slidably comes in contact with the cam 43, starting at point 50, and the swinging or rocking movement based on fulcrum 42 is accelerated, resulting in more rapid movement of the hook 41 away from the head 42' of stud 12, until the surface 33 approaches contact with the inside wall 15' of stud 15 and surface 35 approaches contact with the upper portion 10b of the solid body of the fastener 10, as shown in Figure 6, whereupon the fastener 10 may be readily removed from contact with the stud 12. Thereupon the upward movement of the locking sleeve or ring 11 is arrested by the sleeve 28 of the detent mechanism and each dog is firmly held in open, unlocked position by the cam 43 bearing on the inside wall 19 of the locking sleeve or ring 11, the lower extremity of the surface 33 contacting the inside wall 15' of the stud 15, the surface 35 loosely contacting the upper solid body of the fastener 10, and the lower lip of the fulcrum 42 bearing on the upper side of the head 16 of the stud 15.

The surface 38 is relatively short and sharply cut away so that the sliding inside wall 19 of the locking sleeve or ring 11 is permitted free movement in the locking and unlocking operation until the upper edge thereof strikes the surface 37 at a point above the horizontal plane of the upper lip of the head 16, and so that a trailing radius 44 of the inside wall 19 may clear the dog when the inside wall 19 slidably contacts the cam 43 and continues its upward movement. In practice I have found it advantageous to round off at radius 44 and also at the corner 45 in order to insure a smooth sliding operation of the locking sleeve or ring 11.

While the instant invention has been shown and described herein in what is conceived to be the most practical and preferred embodiments thereof, it is recognized that departures may be made therefrom within the scope of the invention which is, therefore, not to be limited to the details disclosed herein but is to be accorded the full scope of the claims so as to embrace any and all equivalent devices.

Having described my invention, what I claim as new and desire to secure by Letters Patent is:

1. A fastener embodying locking dogs and adapted to releasably lock a mountable element to an anchor member and comprising a cylindrical body solid at its upper end and hollow tubular at its lower end, said body being provided with a flange and having radially arranged slots in the hollow tubular end of the body, locking dogs rockably confined in said slots, each of said dogs being formed with a fulcrum element adapted to engage said flange, and a hook element adapted to engage the anchor member, whereby the mountable element may be locked to the anchor member, a slidable locking ring having an internally flanged shoulder at the lower edge thereof and adapted to engage said dogs and adapted to rock and rotate the dogs into locked or unlocked position, and a spring-actuated detent mechanism mounted at the solid upper end of said cylindrical body, biased to extend beyond said locking ring so as to restrain said locking ring when said locking ring is in position to lock said dogs, and adapted to engage said internally flanged shoulder of said locking ring when said locking ring is in position to unlock said dogs.

2. A fastener embodying locking dogs and adapted to releasably lock a mountable element to an anchor member and comprising a body provided with a flange and having slots, locking dogs rockably confined in said slots, each of said dogs being of wide-topped boot-like configuration and having a hook element at its lower end, an upwardly extending surface at right angles to said hook element, a fulcrum at right angles to said surface and adapted to engage said flange, a second surface extending upwardly and inwardly from the fulcrum toward the vertical axis of the dog, a third surface extending upwardly and across said axis from its intersection with the second surface but at an angle sharply reduced from the upward and inward angle of said second surface, a fourth surface extending outwardly from said axis and downwardly to form a cam having a sharply defined lower face extending inwardly toward said axis and downwardly, a fifth surface extending from said lower face inwardly toward said axis and downwardly at an angle sharply reduced from the angle of the lower face of said cam, a sixth surface intersecting said fifth surface and extending outwardly from said axis and downwardly, a seventh surface intersecting said sixth surface and extending downwardly, parallel to the first surface, to a right angle intersection with the hook element, the hook element being adapted to engage the anchor member, whereby the mountable element may be locked to the anchor member, a slidable locking sleeve adapted to engage said dogs and adapted to rock and rotate the dogs into locked or unlocked position, and means restraining the locking sleeve when in position to lock the dogs.

3. The combination of a fastener element embodying a dog engaging portion, an anchor element embodying a dog engaging portion, a sleeve encompassing said elements, and a dog interposed between the sleeve and both said engaging portions, said dog being freely disposed for rocking movement and embodying contact portions for contact with said respective engaging portions of the fastener element and the anchor element, said dog being of wide-topped boot-like configuration and having a hook element at its lower end, an upwardly extending surface at right angles to said hook element, a fulcrum at right angles to said surface and adapted to engage a portion of said anchor element, a second surface extending upwardly and inwardly from the fulcrum toward the vertical axis of the dog, a third surface extending upwardly and across said axis from its intersection with the second surface but at an angle sharply reduced from the upward and inward angle of said second surface, a fourth surface extending from said axis and downwardly to form a cam having a sharply defined lower face extending inwardly toward said axis and downwardly, a fifth surface extending from said lower face inwardly toward said axis and downwardly at an angle sharply reduced from the angle of the lower face of said cam, a sixth surface intersecting said fifth surface and extending outwardly from said axis and downwardly, a seventh surface intersecting said sixth surface and extending downwardly, parallel to the first surface, to a right angle intersection with the hook element.

4. The combination of a fastener element embodying a dog engaging portion, an anchor element embodying a dog engaging portion, a sleeve encompassing said elements, and a dog interposed between the sleeve and both said engaging portions, said dog being freely disposed for rocking movement and embodying contact portions for contact with said respective engaging portions of the fastener element and the anchor element, said dog being of wide-topped boot-like configuration and having a hook element at its lower end, an upwardly extending surface at right angles to said hook element, a fulcrum at right angles to said surface and adapted to engage a portion of said anchor element, a second surface extending upwardly and inwardly from the fulcrum toward the vertical axis of the dog, a third surface extending upwardly and across said axis from its intersection with the second surface but at an angle sharply reduced from the upward and inward angle of said second surface, a fourth surface extending outwardly from said axis and downwardly to form a cam having a sharply defined lower face extending inwardly toward said axis and downwardly, a fifth surface extending from said lower face inwardly toward said axis and downwardly at an angle sharply reduced from the angle of the lower face of said cam, a sixth surface intersecting said fifth surface and extending outwardly from said axis and downwardly, a seventh surface intersecting said sixth surface and extending downwardly, parallel to the first surface to a right angle intersection with the hook element, the dog being positioned relative to the sleeve whereby the contact portions of said dog may be positioned to lock the fastener element and anchor element together or to free them for separation.

References Cited in the file of this patent

UNITED STATES PATENTS

| | | |
|---|---|---|
| 1,425,618 | Vodicka | Aug. 15, 1922 |
| 1,647,781 | Carr | Nov. 1, 1927 |
| 2,194,386 | Dunaway | Mar. 19, 1940 |
| 2,346,706 | Stoner | Apr. 18, 1944 |
| 2,448,817 | McArthur | Sept. 7, 1948 |
| 2,726,060 | Elsner | Dec. 6, 1955 |
| 2,739,361 | Elsner | Mar. 27, 1956 |